United States Patent [19]

Hattori et al.

[11] 4,020,813
[45] May 3, 1977

[54] AIR-TO-FUEL RATIO CONTROL MEANS FOR CARBURETER

[75] Inventors: Tadashi Hattori, Nishio; Toshiharu Iwata, Okazaki; Takamichi Nakase, Gamagori, all of Japan

[73] Assignee: Nippon Soken, Inc., Nishio, Japan

[22] Filed: June 4, 1974

[21] Appl. No.: 476,271

[30] Foreign Application Priority Data

June 5, 1973 Japan .............................. 48-63470
Jan. 11, 1974 Japan .............................. 49-6867

[52] U.S. Cl. ...................... 123/124 B; 123/119 D; 123/124 R; 60/285; 123/119 EE
[51] Int. Cl.² ...................................... F02M 23/04
[58] Field of Search ....... 123/119 D, 124 R, 124 B, 123/119 E; 60/276, 285

[56] References Cited

UNITED STATES PATENTS

| | | | |
|---|---|---|---|
| 965,322 | 7/1910 | Peterson .............................. | 251/305 |
| 3,586,145 | 6/1971 | Cunningham, Jr. et al. .... | 192/84 C |
| 3,707,954 | 1/1973 | Nakada et al. ................. | 123/119 D |
| 3,721,222 | 3/1973 | Shioyo et al. ................... | 123/124 B |
| 3,738,341 | 6/1973 | Loos ..................................... | 60/276 |
| 3,759,232 | 9/1973 | Wahl et al. ..................... | 123/119 D |
| 3,828,749 | 8/1974 | Knapp ................................ | 60/276 |

Primary Examiner—Wendell E. Burns
Assistant Examiner—David D. Reynolds
Attorney, Agent, or Firm—Cushman, Darby & Cushman

[57] ABSTRACT

An air-to-fuel ratio control means provided in a carbureter of an automobile, in which control means a control valve for controlling the rate of flow of compensating air or compensating fuel is provided. Also, a drive means is provided to fix the control valve at positions at which an optimum air-to-fuel ratio is obtained depending upon the engine operating conditions, namely at the time of cold starting, under low-load low-speed and high-load high-speed engine operating conditions.

2 Claims, 26 Drawing Figures

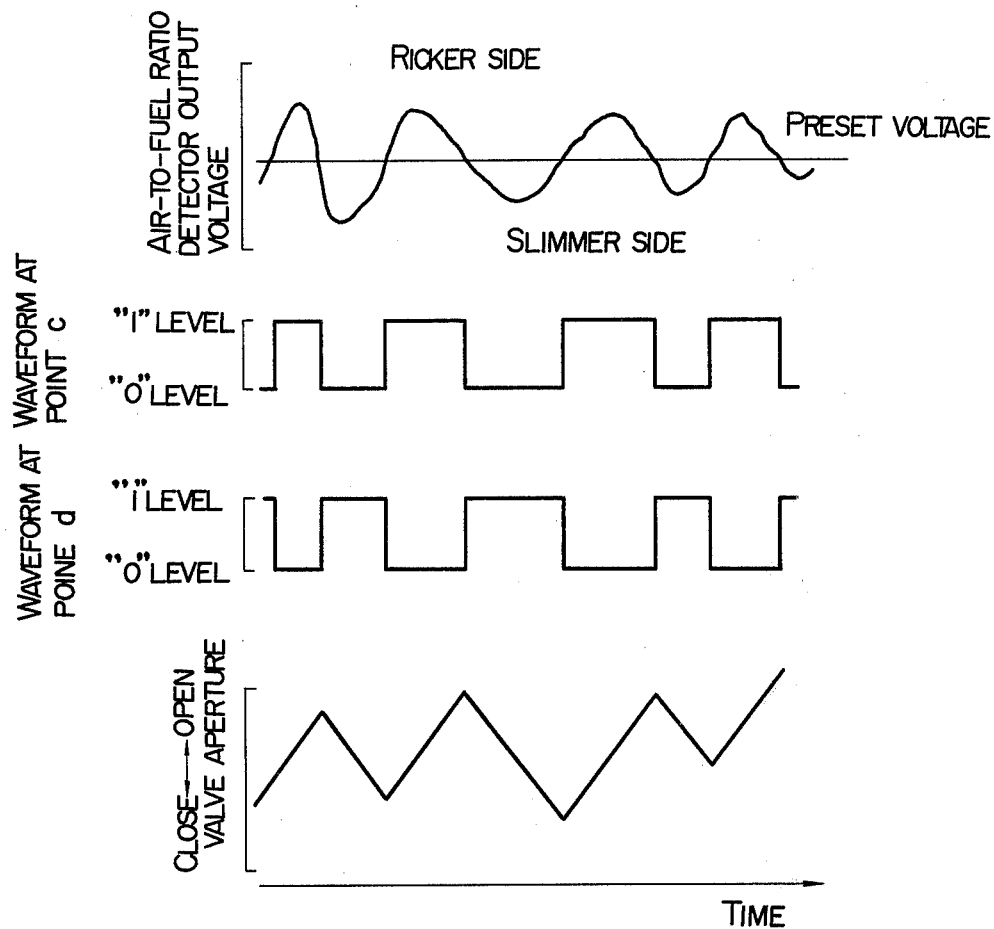

FIG. 10A  FIG. 10B
FIG. 11
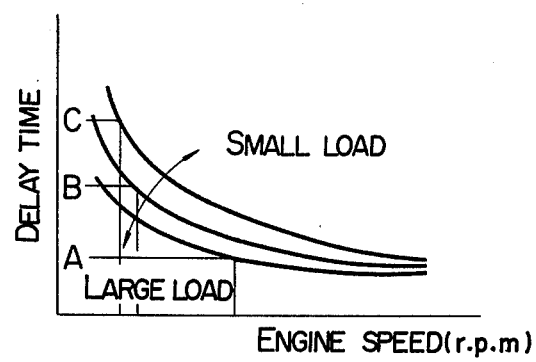

AIR-TO-FUEL RATIO CONTROL MEANS FOR CARBURETER

BACKGROUND OF THE INVENTION

1. Field of the Invention

Proper control of the air-fuel mixture supplied from carbureter to the engine is very important in engine operation. This is always required in the case when it is desired to obtain the utmost effect of an improved engine devised to cope with automotive exhaust gas problems or when it is desired to obtain optimum catalytic purification of the exhaust gas of an engine provided with a catalytic converter for purifying the exhaust gas. This invention relates to an air-to-fuel ratio control means, which can sufficiently meet the above requirements.

2. Description of the Prior Art

Heretofore, in the above type of air-to-fuel ratio control means for carbureters it has been usual to adjust the carbureter such that it provides slightly richer air-fuel mixture than the theoretical one, while operating a control valve controlling the flow of air through a conpensating air passage provided separately from the main carbureter passage according to the output of a discriminating circuit discriminating whether the air-to-fuel ratio is on the richer side or leaner side of the theoretical ratio from the output of an air-to-fuel ratio detector provided in the exhaust system to the value required for the catalytic exhaust gas purifier or the like provided in the exhaust system.

In such system, the air-to-fuel detector begins to provided its proper function when a certain termperature, i.e., activation temperature is reached. This temperature differs with different detectors. For example, the activation temperature of an air-to-fuel detector using metal oxide based in zirconium dioxide is as high as about 400° C. With this detector the intended control of the air-to-fuel ratio cannot be obtained at the time of starting of the engine, particulalry at the time of cold starting (starting of the engine before it is warmed-up). Also, where the control valve is a butterfly valve ratatable within a limited angle as shown in FIG. 2, inconvenience is encountered in case when the required air-to-fuel ratio of the air-fuel mixture is not provided in the cold engine state or even when the fully closed position of the valve is reached. In such case, the discriminating circuit continually supplies a signal for driving the butterfly valve to the drive motor. Consequently, the drive motor tries to further rotate the butterfly valve, so that torsional rupture of the butterfly valve or trouble of the drive motor itself is liable to result. If the control valve is a butterfly valve without any limitation on the rotational angle as shown in FIG. 3, it would be to the "overrun" state, in which state the normal air-to-fuel ration control is no longer possible.If other valves than the above butterfly valves are used as the control valve, similar problems are encountered due to the use of stopper means from other factors.

Further. even in the normal operation of the above system, increasing the valve opening speed of the control valve leads to th problem of increased control width particularly under low-load low-speed engine operation conditions due to the delay time inherent in the whole system, although the air-to-fuel ratio more quickly converges to the required ratio under high-laod high-speed engine operating conditions or in transient engine states.

SUMMARY OF THE INVENTION

With a view to overcoming to the above-mentioned drawbacks, an object of the invention is to provide an air-to-fuel ratio control means for a carburater in which there is provided means for detecting a situation beyond the control of a control valve and holding the control valve locked in such situation to thereby prevent the control valve or drive means such as a pulse motor from being ruptured.

Another object of the invention is to set the control valve at a preset position or aperture before the reaching of the activation temperature of the air-to-fuel ratio detector and prevent the "overclosing" or "overopening" of the control valve by providing a potentiometer detecting the position of the control valve.

Another object of the invention is to control the air-to-fuel ratio strictly to be put within a small range by a butterfly valve serving as the control valve under low-load low-speed engine operating conditions with a control valve drive pulse motor whose pulse frequency well suit to that under high-load high-speed engine operating conditions and in transient engine states by reducing the changing rate aperture area of the compensating air passage per pulse supplied to the pulse motor under the low-load low-speed conditions by means of a groove provided in the inner wall of the compensating air passage facing the end of the butterfly valve.

A further object of the invention is to provide an air-to-fuel ratio control means, which permits smooth starting of an engine even in the cold state by so arranging that at the time of cold starting of engine the air-to-fuel ratio is made richer than the preset value for engine operation after the warm-up through the function of an electromagnetic clutch actuated according to the detected state of the air-to-fuel detector, as well as permitting increase of the exhaust gas purifying efficiency.

BRIEF DESCRIPTION OF THE DRAWING

FIGS. 2b and 3b are sectional views of compensating air passages respectively provided with the control valves of FIGS. 2a and 3a.

FIG. 9 is a time chart for illustrating the operation of the discriminating circuit.

FIGS. 10A and B are a waveform charts to illustrate the operation of the reversible shift registor shown in FIG. 8.

FIG. 11 is a graph showing delay time versus engine speed characteristics of the air-to-fuel ratio control means.

A first embodiment of the invention will now be described. Referring to FIG. 1, reference numeral 1 designates a carburetor, numeral 2 an intake manifold, numeral 3 an engine, numeral 4 an exhaust manifold, numeral 5 a catalystic converter, numeral 6 an air-to-fuel ratio detector to detect the air-to-fuel ratio, and numeral 7 a discriminating circuit. Designated at 8-1 is a pulse motor controlled by the output of the discriminating circuit 7. A butterfly valve 10a is coupled to the pulse motor 8-1 and driven thereby. Numeral 9 designates a potentiometer for detecting the position of the butterfly valve 10a. Indicated at 11a and 11b is a compensating air passage for adjusting the air-to-fuel ratio, with the passage 11a connecting an air cleaner 12 and a valve housing 10 accommodating the butterfly valve 10a and the passage 11b connecting the valve housing 10 and a portion of the intake manifold 2 downstream a throttle valve 13.

FIGS. 4, 5a, 5b and 6 show the valve housing 10 and a butterfly valve 10a in detail. As is shown, a portion of the valve housing 10 facing the ends of the butterfly valve 10a is provided with a groove 10b.

The butterfly valve 10a is coupled both to pulse motor 8-1 and potentiometer 9. According to the signal from the air-to-fuel ratio detector 6 the discriminating circuit 7 produces its output signal to control the rotation of the pulse motor 8-1 so as to control the aperture of the butterfly valve 10a for providing the optimum air-to-fuel ratio, while the normal operation of the butterfly valve 10a is ensured through the detection of its aperture in terms of the resistance tapped from the potentiometer 9.

Figure 7:
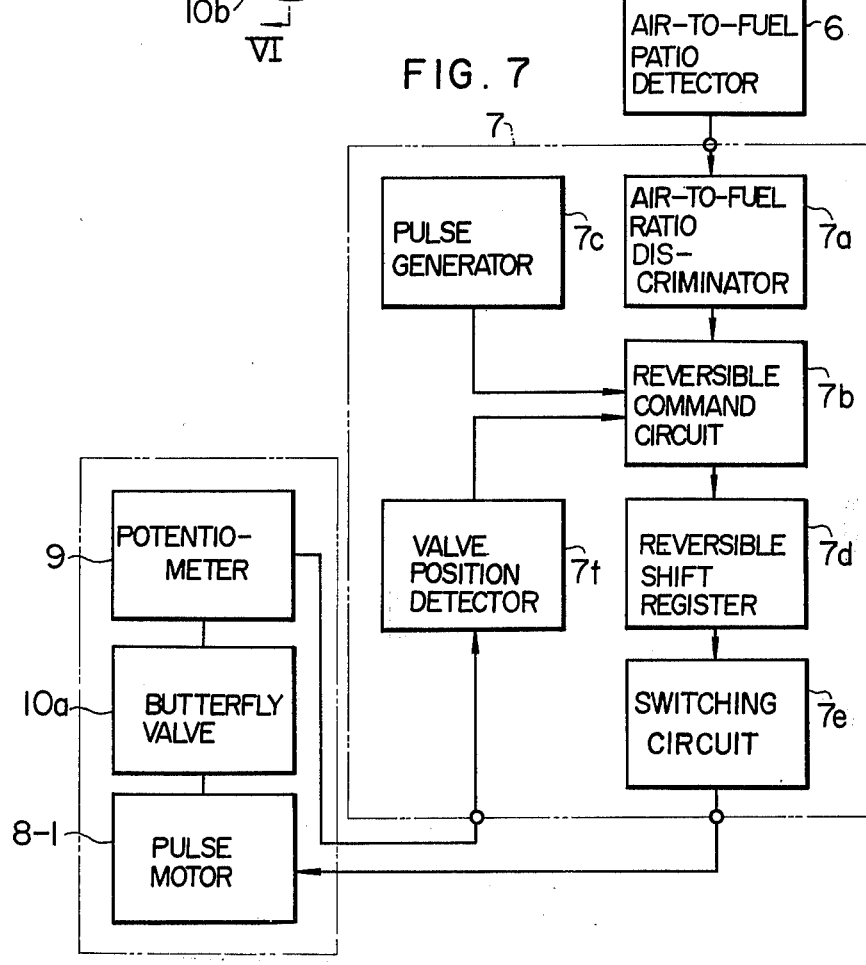
FIG. 7 is a block diagram of the discriminating circuit shown in FIG. 1.
Figure 8:
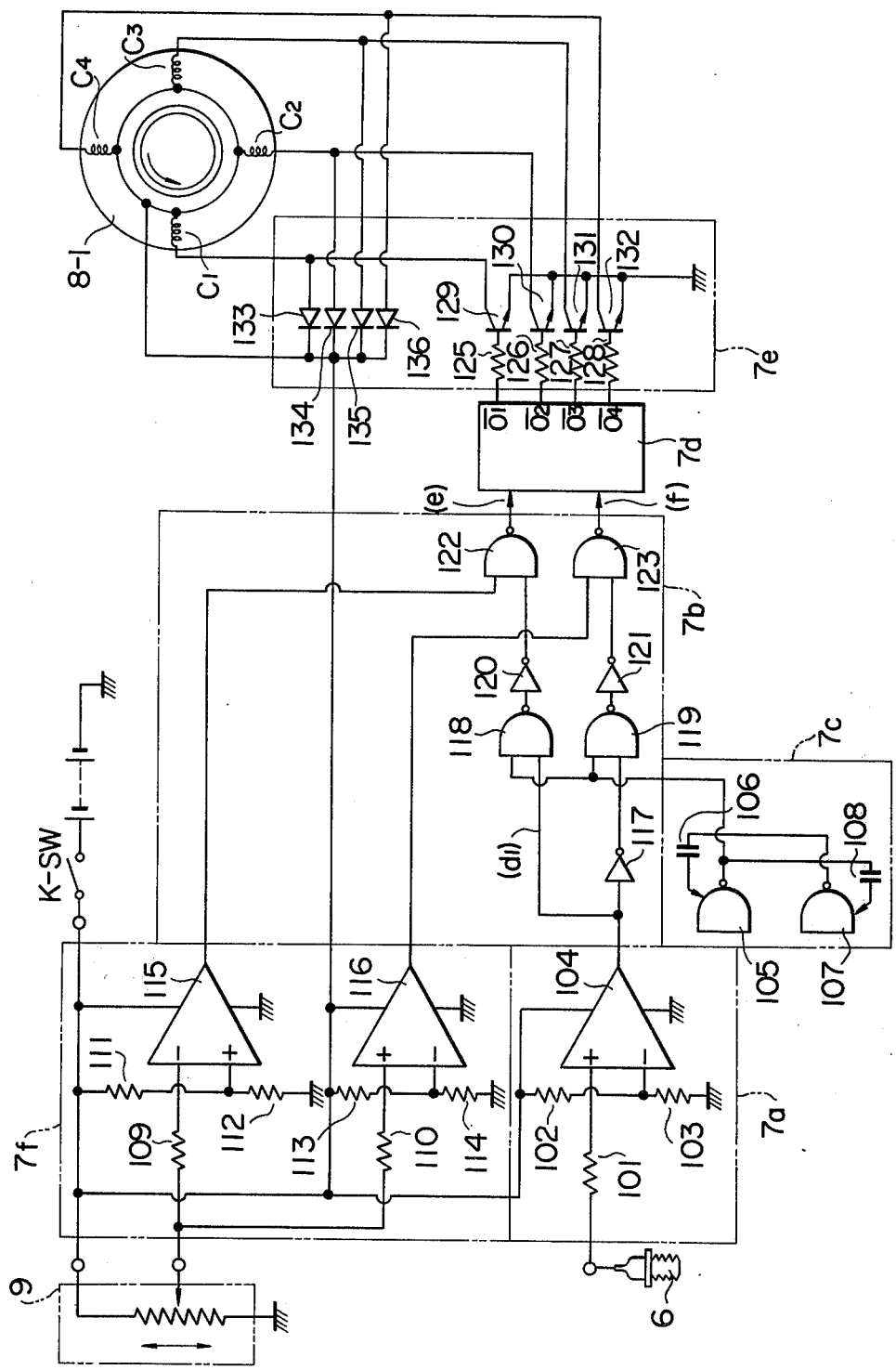
FIG. 8 is a circuit diagram of this discriminating circuit.

FIGS. 7 and 8 are respectively block diagram and circuit diagram of the discriminating circuit 7. As is outlined in FIG. 7, the discriminating circuit 7 comprises an air-to-fuel ratio discriminator 7a, a reversible command circuit 7b, a pulse generator 7c, a reversible shift register 7d, a switching circuit 7e and a valve position detector 7f.

The operation of the above construction will now be described with reference to the circuit diagram of FIG. 8. The carburetor 1 undertakes the ordinary role of mixing air and fuel is not particularly set apart from any well-known carburetor. The only difference is that the air-to-fuel ratio is controlled to a slightly richer state than the eventual one that is intended to be obtained, and the main air permitted through the carbureter 1 is mixed with the corresponding amount of fuel to form the mixture supplied to the engine. The exhaust gas produced after the combustion of the mixture in the engine is exhausted through the exhaust manifold 4 an catalytic converter 5 to the atmosphere, and the prevailing air-to-fuel ratio is detected by the air-to-fuel detector 6, which is provided at a portion of the exhaust gas passage of the exhaust manifold 4. The output signal of the air-to-fuel detector 6 goes into the discriminating circuit 7, which discriminates whether the prevailing air-fuel mixture is richer or leaner than the theoretical one and commands the pulse motor 8-1 to drive the butterfly valve 10a provided in the compensating air passage 11a and 11b toward the open state if the mixture is in a richer state while driving the butterfly valve toward the closed state in case of the leaner mixture, thereby compensating the air-to-fuel ratio with the compensating air to the theoretical ratio.

The control of the pulse motor 8-1 will now be described with reference to FIGS. 8, 9 and 10. The output signal of the air-to-fuel ratio detector 6, which uses a metal oxide base on zirconium dioxide in this embodiment, is coupled to the air-to-fuel ratio discriminator 7a in the discriminating circuit 7. The discrminator 7a comprises resistors 101, 102 and 103 and a comparator 104. It comprises the output signal of the detector 6 with a preset voltage determined by the resistors 102 and 103 (the voltage being substantially equal to the electromotive force in the detector 6 at the theoretical air-to-fuel ratio), and it provides output of level "1" if the prevailing air-fuel mixture ratio is on the richer side of the theoretical one while providing output of lever "0" if the prevailing mixture is on the leaner side of the theoretical one. The pulse generator 7c consists of a multi-vibrator comprising NAND circuits 105 and 107 and capacitors 106 and 108. Its pulse repetition frequency is set such as to permit optimum control. A predetermined voltage is applied across the potentiometer 9 serving to detect the aperture of the butterfly valve 10a. With the rotation of the butterfly valve 10a the movable contact of the potentiometer 9 is moved to vary the tapped resistance between the movable contact and earth. The voltage across the tapped resistance is coupled as an output signal to the valve position aperture detector 7f. The valve position detector 7f comprises a fully open position detecting circuit consisting of resistors 109, 111 and 112 and a comparator 115 and a fully closed position detecting circuit consisting of resistors 110, 113 and 114 and a comparator 116. When the butterfly valve 10a is at the fully closed position, only the fully open position detecting circuit produces output of level O, while at the fully open valve position the fully open position detecting circuit provides an output of level O. At all other times, both the detecting circuits provide output of level 1. The output signal of the air-to-fuel ratio detector 6, the output signal of the valve position detector 7f and the pulse signal of the pulse generator 7c are all coupled to the reversible command circuit 7b to produce signal commanding forward or reverse rotation of the pulse motor 8-1. The reversible command circuit 7b is a logic circuit comprising NOT circuits 117, 120 and 121 and NAND circuits 118, 119, 122 and 123. When the airfuel mixture is on the richer side of the theoretical one, the NAND circuit 118 is open to permit the pulse signal of the pulse generator 7c to a corresponding input terminal e of the reversible shift register 7d, while with a leaner mixture than the theoretical one the NAND circuit 119 is open to permit similar pulse signal to a corresponding input terminal f of the reversible shift register 7d. With pulse signal input at the input terminal e of the shift register 7d, its output terminals $\overline{O}_1, \overline{O}_2, \overline{O}_3$ and $\overline{O}_4$ are successively shifted in a manner as shown at A in FIG. 10. On the other hand, with pulse signal input at the terminal f the output terminals are shifted in the converse way as shown at B in FIG. 10. The output terminals $\overline{O}_1, \overline{O}_2, \overline{O}_3$ and $\overline{O}_4$ are connected to the switching circuit 7e, which comprises resistors 125, 126, 127 and 128, transistors 129, 130, 131 and 132 and back electromotive force absorption diodes 133, 134, 135 and 136. The switching circuit 7e is connected to field coils $C_1, C_2, C_3$ and $C_4$ of the pulse motor 8-1. When the pulse signal is added to the input terminal e of the reversible shift registor 7d, the transistors 129, 130, 131 and 132 are successively triggered to successively excite the respective field coils $C_1, C_2, C_3$ and $C_4$ of the pulse motor 8-1 two phases at a time, whereby the rotor of the pulse motor 8-1 is rotated in the direction of arrow in FIG. 8. Thus, when the air-fuel mixture is on the richer side of the theoretical one, namely when the air-to-fuel ratio is lower than the theoretical air-to-fuel ratio , the pulse motor is rotated in the direction of opening the butterfly valve 10a. When the pulse signal is added to the other terminal f, the pulse motor is rotated in the direction opposite to the direction of the arrow i.e., in the direction of closing the butterfly valve 10a . In order to prevent "overrun" of the butterfly valve 10a beyond its fully open or fully closed position in such case as when the required air-to-fuel ratio is not met upon reaching of the fully closed valve position, the supply of pulse signal to the reversible shift register 7d is cut upon detection of such a situation. More particularly, upon detection of, for instance, the fully closed position of the butterfly valve 10a by the potentiometer 9, the valve position detector 7f closes the NAND circuit 123 to cut supply of the pulse signal to the reversible shift resigter 7d, thus stopping the rotation of the pulse motor 8-1 in the direction of closing the butterfly valve 10. Upon detection of the fully open position of the butterfly valve 10a, the valve position detector 7f this time closes the NAND circuit 122 to cut supply of the pulse signal to the reversible shift register 7d, thus stopping the rotation of the pulse motor 8-1 in the direction of opening the butterfly valve 10a. In the above way, the problem of overrun of the butterfly valve 10a to disable the normal air-to-fuel ratio control can be solved.

In the instant embodiment, the air-to-fuel detector 6 uses a metal oxide based on zirconium dioxide as mentioned earlier. This metal oxide permits the generation of electromotive force according to the ratio between partial pressures of oxygen on opposite sides of the metal oxide partition wall, that is, the oxygen partial pressure in the engine exhaust gas and the oxygen partical pressure in the atmosphere, and its activation temperature is as high as 400° C. At the time of cold starting of the engine, therefore, the air-to-fuel ratio detector 6 remains at lower temperature than its activation temperature and produces a low output, similar to one that is produced when a great quantity of oxygen is contained in the exhaust gas, that is, when the air-to-fuel ratio is high so that without the potentiometer 9 the discriminating circuit would continually produce the signal for closing the butterfly valve 10a. With the potentiometer 9 detecting the position of the butterfly valve 10a, the overrun thereof can be prevented. In the mean time, at the time of cold starting of the engine or in engine operation during warm-up the air-fuel mixture has to be slightly richer than the theoretical one in order to obtain satisfactory engine operation. In the instant embodiment, the butterfly valve 10a is closed in the above situation to provide richer air-fuel mixture due to the afore-mentioned characteristic of the air-to-fuel ratio detector 6, and the detector output gradually increases with the lapse of time. Thus, the control of the air-to-fuel ratio can be effected according to this output alone.

To obtain more desired air-to-fuel ratio during warm-up, a second preset voltage level may be provided separately from the one mentioned earlier, and the butterfly valve 10a may be locked during warm-up at a position, at which the tapped voltage level of the potentiometer 9 co-operating with the butterfly valve 10a is equal to the second preset voltage level. By so doing, any desired air-t0-fuel ratio may be obtained. In this case, the releasing of the butterfly valve 10a from its locked position may be done after the lapse of sufficient time for the warm-up by means of, for instance, a timer circuit or when the temperature of the air-to-fuel ratio detector 6 exceeds the activation temperature by means of a temperature sensor detecting the temperature of air-to-fuel ratio detector 6, and after the releasing of the butterfly valve the afore-mentioned normal air-to-fuel ratio control may be effected.

Figure 2A:
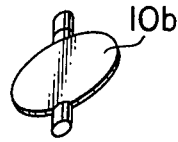
FIGS. 2a and 3a are perspective views of prior art control valves.
Figure 3A:
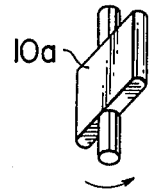
Figure 2B:
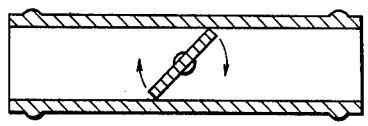
Figure 3B:
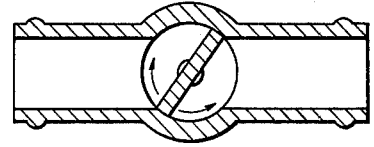
Figure 4:
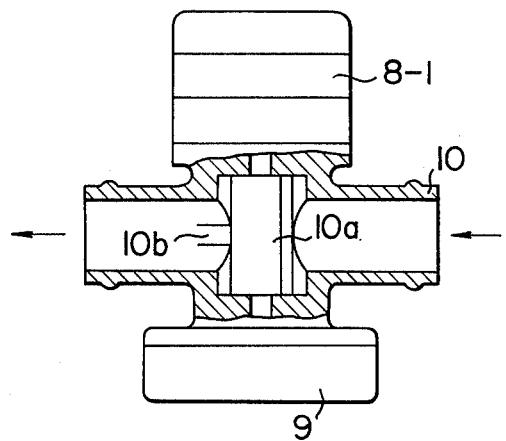
FIG. 4 is a view partly in section showing part of the system of FIG. 1.
Figure 5A:
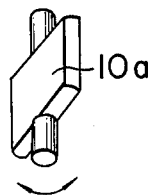
FIG. 5a is a perspective view of the butterfly valve shown in FIG. 4.
Figure 6:
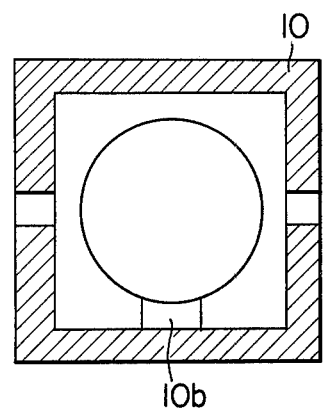
FIG. 6 is a section, to an enlarged scale, taken along line VI—VI in FIG. 5b.
Figure 5B:
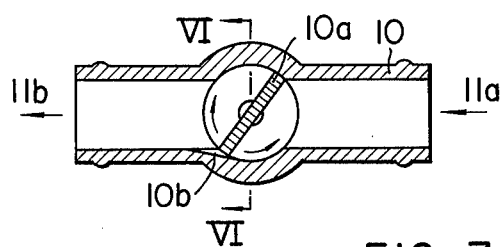
FIG. 5b is a sectional view of the valve housing shown in FIG. 4.
Figure 12:
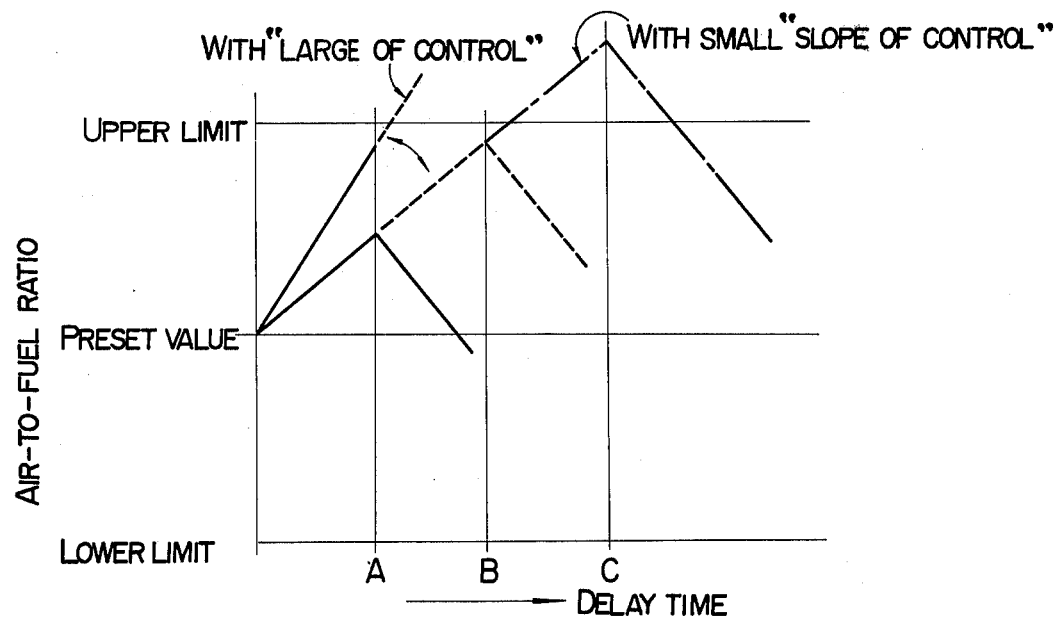
FIG. 12 is a graph showing air-to-fuel ratio control width versus delay time characteristic.
Figure 13:
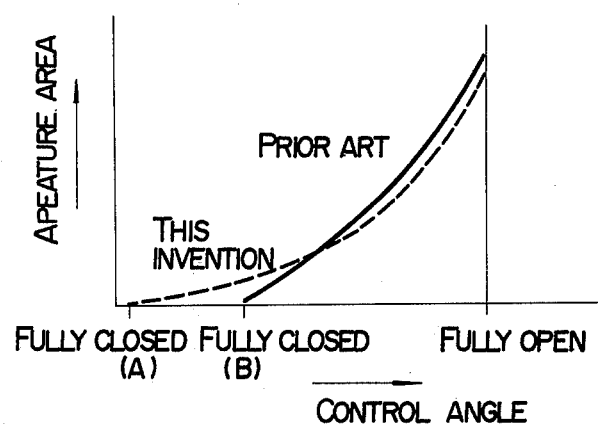
FIG. 13 is a graph showing aperature area versus position characteristic of the butterfly valve shown in FIG. 1.

In a further aspect, with the usual butterfly valve such as those shown in FIGS. 2 and 3, the change of aperture area of th valve per pulse for the pulse motor 8-1 is substantially constant as shown by solid plot in FIG. 13, and the "slope of control" of the air-to-fuel ratio depends upon the pulse drive frequency of the pulse motor 8-1 and the afore-mentioned change of aperture of valve per pulse. This means that provided the pulse frequency is constant the control, width of the air-to-fuel ratio is deterined by the delay time, as shown in FIG. 12. Also, the higher the frequency the quicker is its recovery from a transient state such as at the time of acceleration. By setting an optimum constant frequency to provide for minimum width of air-to-fuel ratio control in both normal and transient states, however, under low condition the control width is increased due to increased delay time, as shown in FIG. 11, so that the phenomenon of hunting is liable to result. In order to prevent this, it is necessary to control the frequency or aperture area change such as to provide a slope of control conforming to the engine operating condition. However, the control of frequency is disadvantageously complicated. In accordance with the invention, the face under low-speed low-load engine operating conditions the air-to-fuel ratio control is made with the butterfly valve 10a at angular position comparatively close to the fully closed position, is utilized. More particularly, the valve housing 10 is provided in its portion facing the ends of the butterfly valve 10a with a groove 10b such that the change of valve aperture area per pulse as mentioned earlier is reduced over the afore-mentioned valve position range, specifically providing a characteristic as shown by the dashed plot in FIG. 13. In this way the slope of control i.e. the control width is reduced to suppress hunting. With this measure, it is possible to set a pulse frequency such as to suppress hunting under high-speed condition and provide improved follow-up characteristic in the transient state, while providing reduced air-to-fuel ratio control width under low-speed low-load condition.

Figure 1:
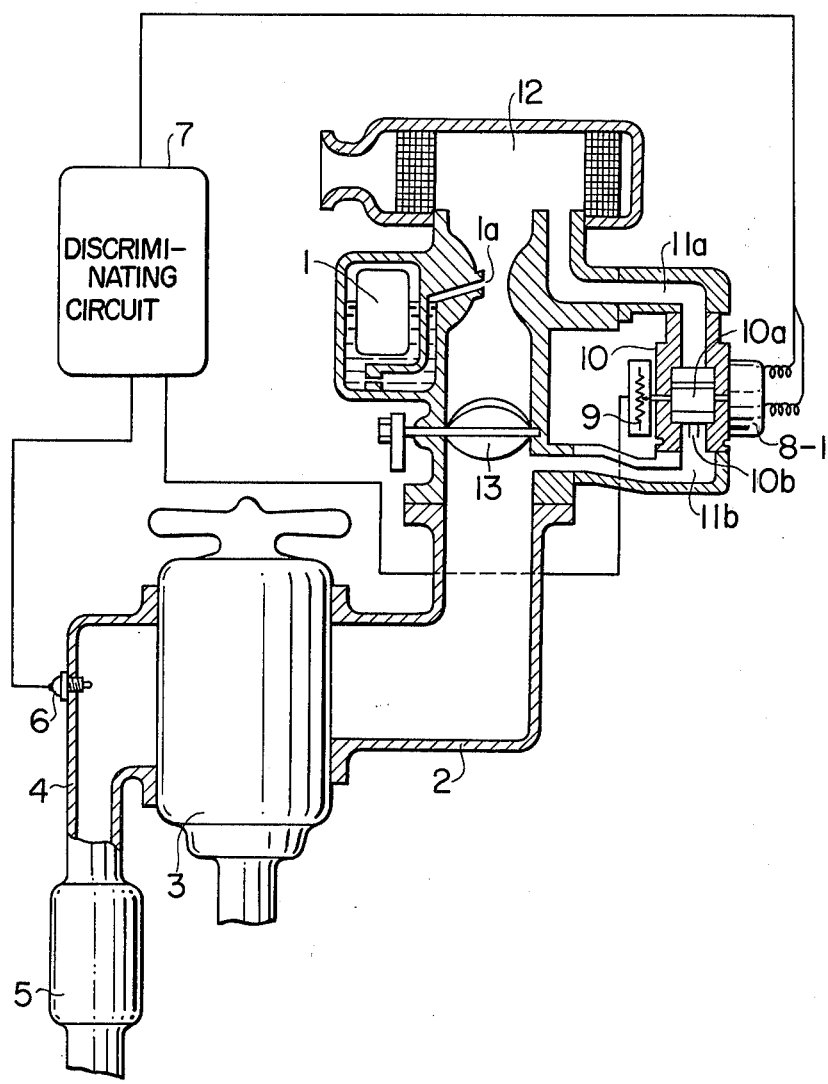
FIG. 1 is a schematic sectional representation of a first embodiment of the invention.
Figure 15:
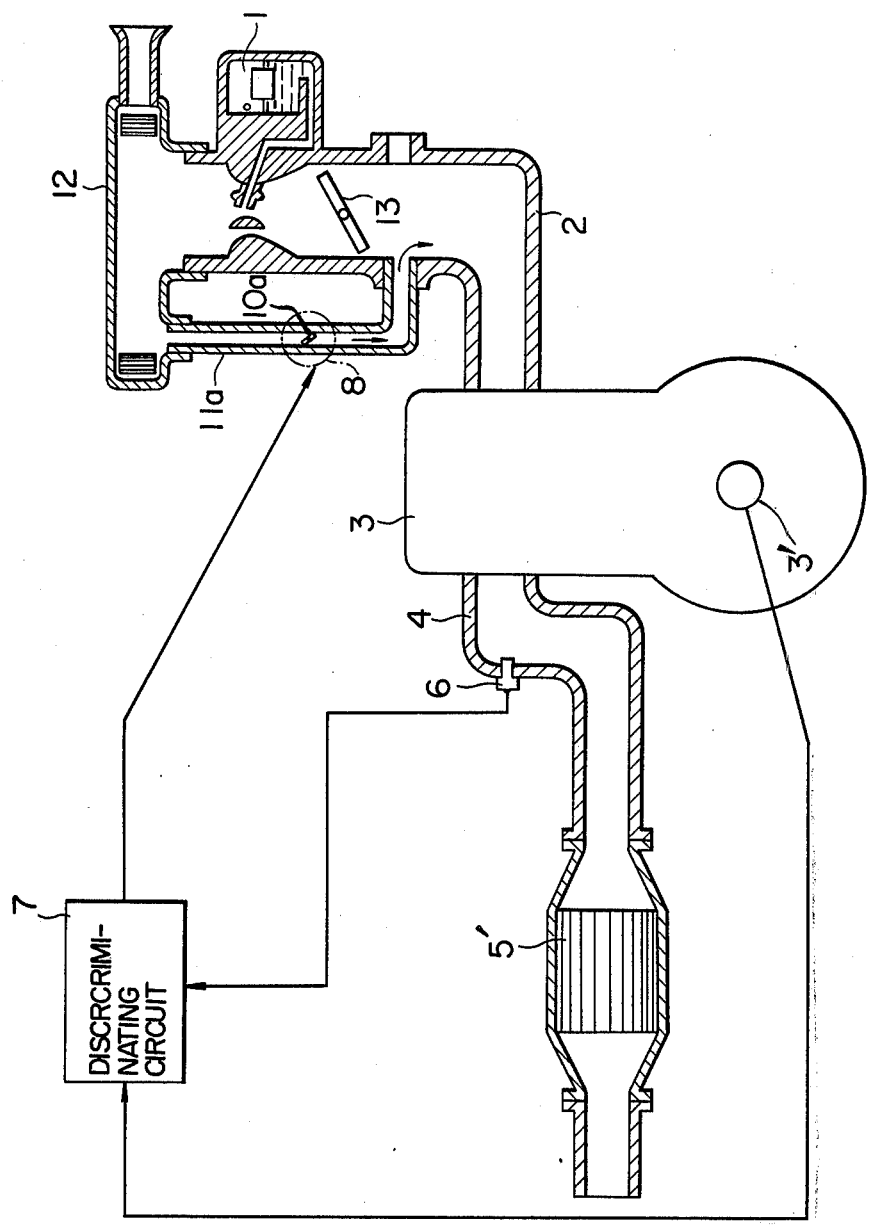
FIG. 15 is a schematic sectional representation of the second embodiment of the invention.

FIG. 15 shows a second embodiment of the invention. In the Figure the same reference characters as those in FIG. 1 designate like parts. Namely, numeral 1 designates a carbureter, numeral 2 an intake manifold, numeral 3 engine, numeral 4 exhaust manifold, numeral 5' a three-component catalytic converter. Designated at 3' is an engine rotation detector installed on the engine crankshaft, at 6 an air-to-fuel ratio detector, at 12 an air cleaner, at 11a a compensating air passage connecting the air cleaner 12 and portion of the intake manifold downstream the throttle valve 13, at 10a a control valve for controlling the aperture area of the compensating air passage 11a, at 8 a drive unit for driving the control valve 10a, and a 7 a discriminating circuit for controlling the drive unit 8 according to the signals from the air-to-fuel ratio detector 6 and engine rotation detector 3'.

Figure 16:
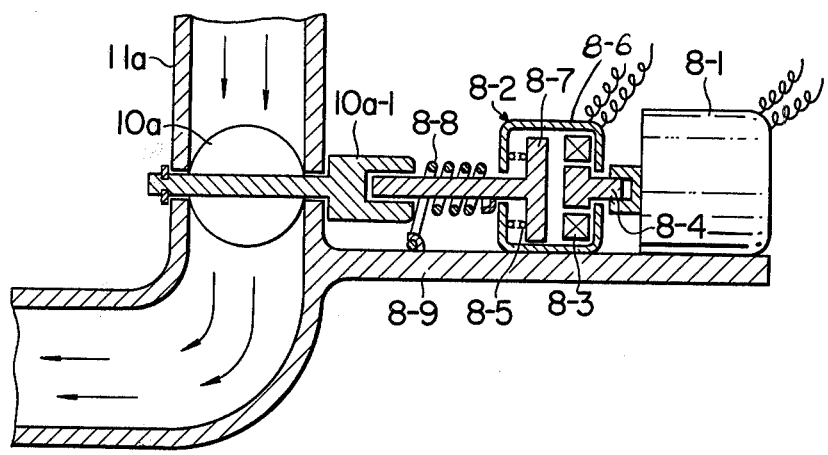
FIG. 16 is a sectional view of the control valve and drive unit shown in FIG. 15.

The drive unit 8 will now be described in connection with FIG. 16. Designated at 8-1 is a pulse motor serving as a drive motor. Designated at 8-2 is an electromagnetic clutch comprising a solenoid 8-3, an axially fixed member 8-4 made of a magnetic material, a tension spring 8-5, a casing 8-6 and an axially movable member 8-7 made of a magnetic material. The fixed and movable member 8-4 and 8-7 are integrally coupled when the solenoid 8-3 is energized, while they are separated from each other upon de-energization of the solenoid. Designated at 8-8 is a torsion coil spring with its opposite end tied respectively to the movable member 8-7 and to a stay 8-9. When the electromagnetic clutch 8-2 is activated, the rotation of the pulse motor 8-1 is tranmitted though the fixed and movable members 8-4 and 8-7 and the control valve shaft 10a-1 to the control valve 10a. When the current through the electromagnetic clutch 8-2 is switched off, the fixed and movable members 8-4 and 8-7 are separated, so that the control valve 10a is brought to the fully closed position by the torson coil spring 8-8.

Figure 14:
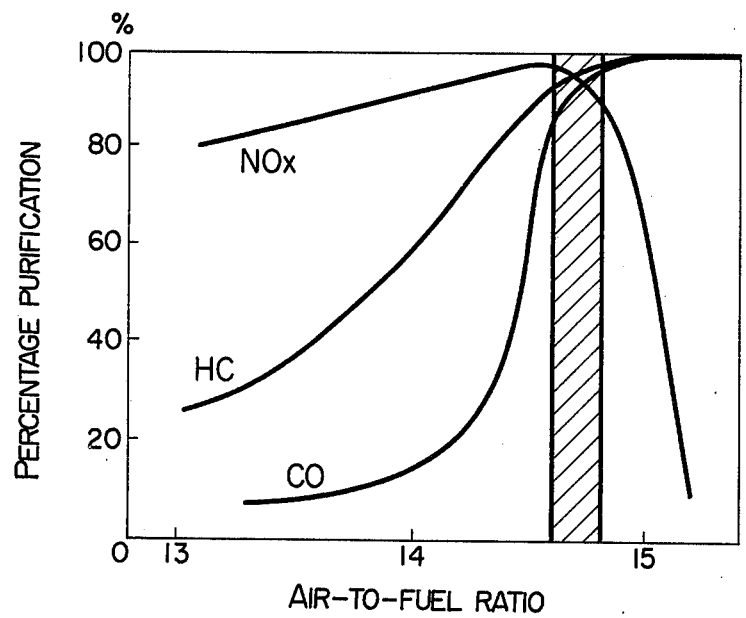
FIG. 14 is a graph representing the performance of the exhaust gas converter used in a second embodiment of the invention.
Figure 21:
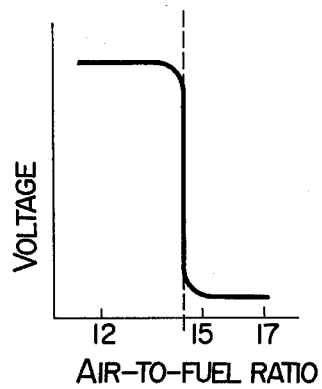
FIG. 21 is a graph showing the characteristic of the exhaust gas detector shown in FIG. 15.

In operation of the above contruction, the carbureter 1 performs the ordinary role of adjusting the air-fuel mixture and is not particularly different from any well-known carbureter. The only difference is that the air-fuel mixture is controlled to be slightly richer than the eventual one, and the main air permitted through the carbureter 1 is mixed with the corresponding amount of fuel to form the air-fuel mixture supplied to the engine. The exhaust gas produced after the combustion of the mixture in the engine is exhausted through the exhaust manifold 4 and three-component catalytic converter 5' to atmosphere. At this time, the state of the exhaust gas is detected by the air-to-fuel ratio detector 6 provided on the exhaust gas passage of the exhaust mainfold 4. In this embodiment, the detector 6 used zirconium dioxide. It is known that with the structure using zirconium dioxide electrode and platinum, a sharp electromotive force versus air-to-fuel ration characteristic as shown in FIG. 21 is obtained owing to the combined effect of the catalytic effect of platinum and the oxygen concentration detecting capacity of zirconium dioxide. Also, it is known that the theoretical air-to-fuel ratio is located substantially at the point of sudden change of the electromotive force. Further, the purifying characteristic of the three-component catalytic converter 5' is as shown in FIG. 14, with the air-to-fuel ratio range where the purification is most effectively made is substantially centered at the point of the theoretical air-to-fuel ratio, although it may slightly vary depending upon the type of the converter. Accordingly, the air-to-fuel ratio is always detected by the air-to-fuel ratio detector using zirconium dioxide to control it to the theoretical air-to-fuel ratio so as to obtain maximum purification of the exhaust gas. However, the oxygen detecting function of zirconium dioxide and the catalytic function of platinum do not come into force unless a temperature of about 400° C is exceeded. At the time of cold starting of the engine, therefore, the electromotive force of the air-to-fuel ratio detector 6 is zero, which indicates that the air-fuel mixture is lean. At this time, the control valve 10a is operated such that a richer air-fuel mixture may be supplied from the carbureter 1. However, this richer air-fuel mixture state continues until the temperature of the air-to-fuel ratio detector 6 is elevated to the afore-mentioned effective temperature. In this case, with a drive signal for driving the control valve 10a it might experience a driving force even if it is locked by stopper means, so that such an accident as rupture of the control valve 10a or drive unit 8 might result. To cope with this problem, according to the invention the electromagnetic clutch 8-2 is provided between the pulse motor 8-1 and control valve 10a such that when the discriminating circuit 7 decides that the engine is started in the warmed-up state the pulse motor 8-1 and control valve 10a ae coupled together, whereby the air-to-fuel ratio is controlled to the theoretical ratio by determining whether the prevailing air-fuel mixture is richer or leaner than the theoretical one, the control here being effected by driving the pulse motor 8-1 in the direction of opening the control valve 10a if the air-fuel mixture is richer than the theoretical one. When the discriminating circuit 7 decides that the engine is started in the cold state, the pulse motor 8-1 and control valve 10A are not coupled together by the electromagnetic clutch 8-2 so that the control vavle 10a may not be forcibly urged with the rotation of the pulse motor 8-1. In this way, the rupture of the control valve or the drive unit therefor can be prevented. Here, in the fully-closed state of the control valve 10a, the air-fuel mixture is so adjusted as to be slightly richer than the theoretical one (for instance, the air-to-fuel ratio is set about 13), so that the smooth starting of the engine may be ensured. When the temperature surrounding the air-to-fuel ratio detector and thereof itself become sufficient high value of about 400° C, at which the air-to-fuel ratio detector is effectively operated, the pulse motor 8-1 and the control valve 10a are coupled together, whereby the abovementioned control for the theoretical air-to-fuel ratio can be performed.

Figure 17:
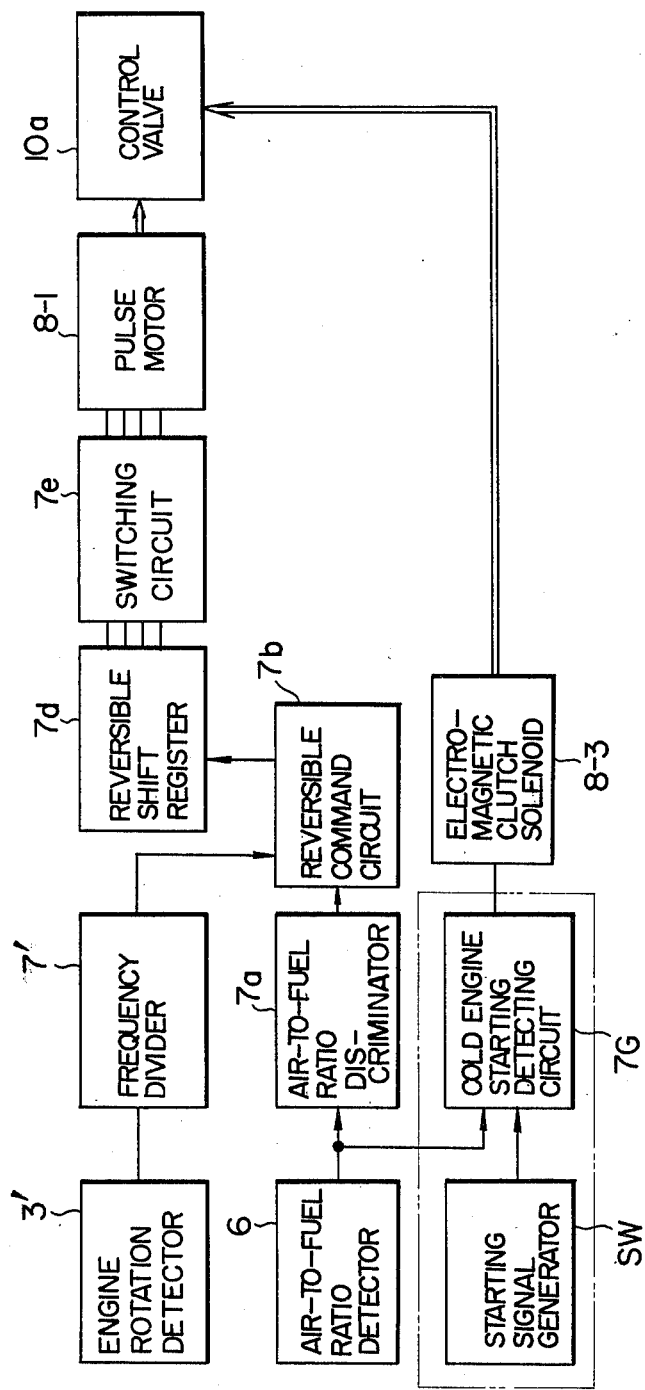
FIG. 17 is a block diagram of the control circuit shown in FIG. 15.
Figure 18:
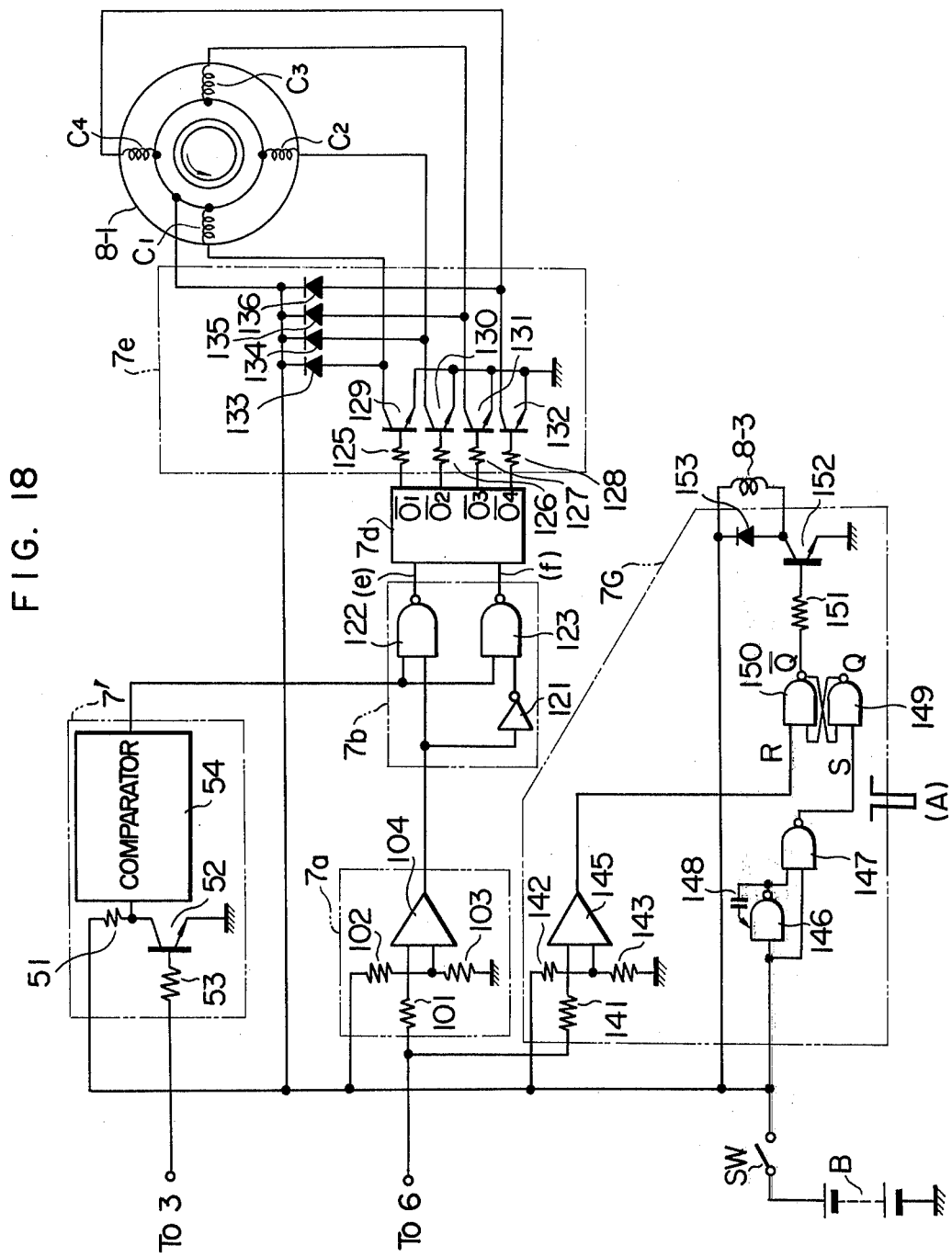
FIG. 18 is a circuit diagram of the same control circuit.

The descriminating circuit 7 will now be described in detail with reference to FIGS. 17 and 18. The engine rotation detector 3' has a switch which is on-off operated in synchronizm to the engine rpm to produce an on-off signal synchronized to the engine. This on-off signal is coupled to a frequency divider 7', which comprises resistors 51 and 53, a transistor 52 and a flip-flop 54 and produces a pulse signal synchronized to the engine. The output voltage of the air-to-fuel ratio detector 6 enters and air-to-fuel ratio discriminator 7a for discriminating whether the air-fuel mixture is on the richer side or leaner side of the theoretical one. This discriminator 7a comprises resistors 101, 102 and 103 and a comparator 104. It provides output of level 1 if the air-fuel mixture is on the richer side of the theoretical one and output of level 0 with air-fuel mixture leaner than the theoretical one. The discrimination voltage is set to be at the mid point between the highest output and lowest output of the air-to-fuel ratio detector 6. The output signal of the discriminating circuit 5 enters a reversible command circuit 7b, which comprises a NOT circuit 121 and NAND circuits 123 and 122. When the air-fuel mixture is on the leaner side the pulse signal of the frequency divider 7' appears at an output terminal e of the reversible command circuit 7b, while with richer air-fuel mixture the pulse signal appears at another output terminal f. The output terminals e amd f are connected a a reversible shift register 7d. When output is present at the terminal e, the output termials $\bar{O}_1$, $\bar{O}_2$, $\bar{O}_3$ and $\bar{O}_4$ of the reversible shift register 7d are successively shifted in the manner as shown in FIG. 10A. On the other hand, when pulse output appears at the terminal f, the output terminals of the reverse shift register 7d are shifted in the converse way as shown in FIG. 10B. The shifting signal enters a switching circuit 7e, which comprises resistors 125, 126, 127 and 128, transistors 129, 130, 131 and 132 and back electromotive force absorption diodes 133, 134, 135 and 136, and when it is coupled to field coils $C_1$, $C_2$, $C_3$ and $C_4$ of the pulse motor 8-1. When a pulse signal appears at the terminal e, the transistors 129, 130, 131 and 132 are successively triggered to successively excite the field coils $C_1$, $C_2$, $C_3$ and $C_4$ two phases at a time, thereby rotating the pulse motor 8-1 in the direction of arrow in FIG. 18 i.e., in the direction of opening the butterfly valve 10a. When pulse signal appears at the other terminal f, the pulse motor is rotated in the direction opposite to the direction of arrow i.e., in the direction of closing the butterfly valve 10a.

Now, a cold engine starting detecting circuit 7G will be described. The output voltage of the air-to-fuel ratio detector 6 is compared with a preset voltage in a circuit comparator comprising resistors 141, 142 and 143 and a comparator 145. The preset voltage is slightly lower than a voltage corresponding to the maximum electromotive force generated when the temperature of the air-to-fuel ratio detector 6 is elevated to a sufficient activation temperature. When the output voltage of the air-to-fuel ratio detector 6 is lower than the preset voltage, the comparator 145 produces an output of level 1, while with a higher voltage the comparator output of of level 0. A starting signal is permitted from a battery B through a key switch SW or the like to a mono-stable multivibrator comprising a NAND circuit 146 provided with an expander, a NAND circuit 147 and a capacitor 148, so that only at the instant of starting a differential pulse as shown at A in FIG. 18 is generated from the mono-stable multi-vibrator. The outputs of comparator 145 and NAND circuit 147 are coupled to an R-S flip-flop consisting of NAND circuits 150 and 149. The R-S flip-flop is set to produce an output of level 1 at the Q output terminal when the starting signal appears upon closure of the key switch SW. When the comparator 145 produces an output of level O, the R-S flip-flop is reset to produce output of level 1 at the $\bar{Q}$ ouput terminal. At this time, a transistor 152 is triggered through a resistor 151 to energize the electromagnetic clutch solenoid 8-3. Numeral 153 designates a back electromotive force absorption diode. At the time of cold starting of the engine, at which time the activation temperature is not reached by the air-to-fuel ratio detector 6 yet, no electromotive force is generated therein, so that the comparator output is of level 1. Thus, upon closure of the key switch SW the R-S flip-flop is set to produce output of level 1 at the output terminal Q. At this time, the electromagnetic clutch 8-2 remains inoperative, without coupling the pulse motor 8-1 and control valve 10a. In consequence, the control valve 10a is brought to the fulley closed position by the action of the torsion coil spring 8-8. As the air-to-fuel ratio detector 6 is progressively warmed up with the control valve 10a at the fully closed position, its electromotive force is progressively increased becuse of the rich air-fuel mixture. When the output voltage of the air-to-fuel ratio detector 6 exceeds the preset voltage, the output of the comparator 145 is inverted to level O, whereupon the R-S flip-flop is reset to produce the output at the terminal $\bar{Q}$. As a result, the electromagnetic clutch solenoid 8-3 is energized to couple the pulse motor 8-1 and control valve 10a for the air-to-fuel ratio control. At the time of starting of the engine after the warm-up, even with the generation of the starting differential pulse the electromagnetic clutch solenoid 8-3 is immediately energized since the comparator 145 immediately provides an output of level O, so that the air-to-fuel ratio control is immediately set in.

Figure 19:
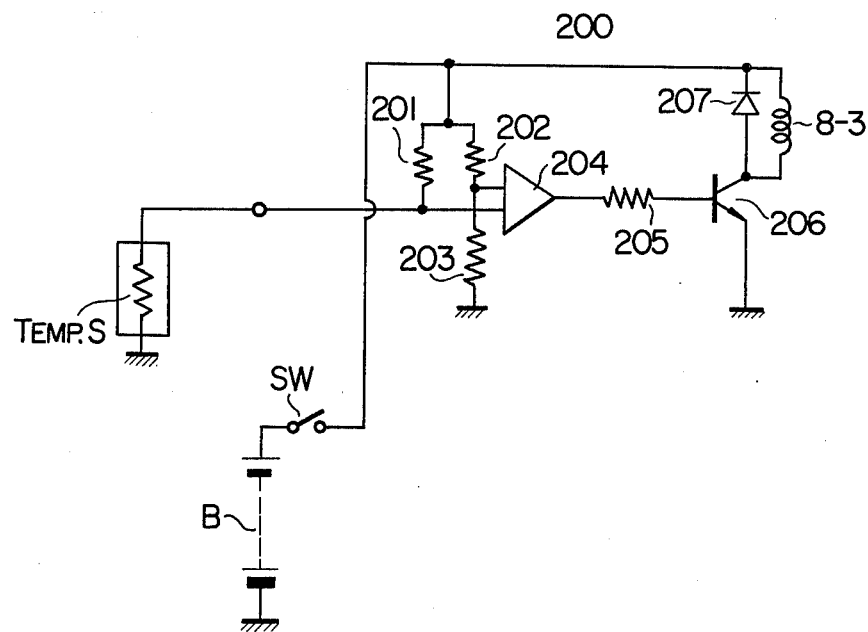
FIGS. 19 and 20 are circuit diagrams showing other examples of the control circuit.
Figure 20:
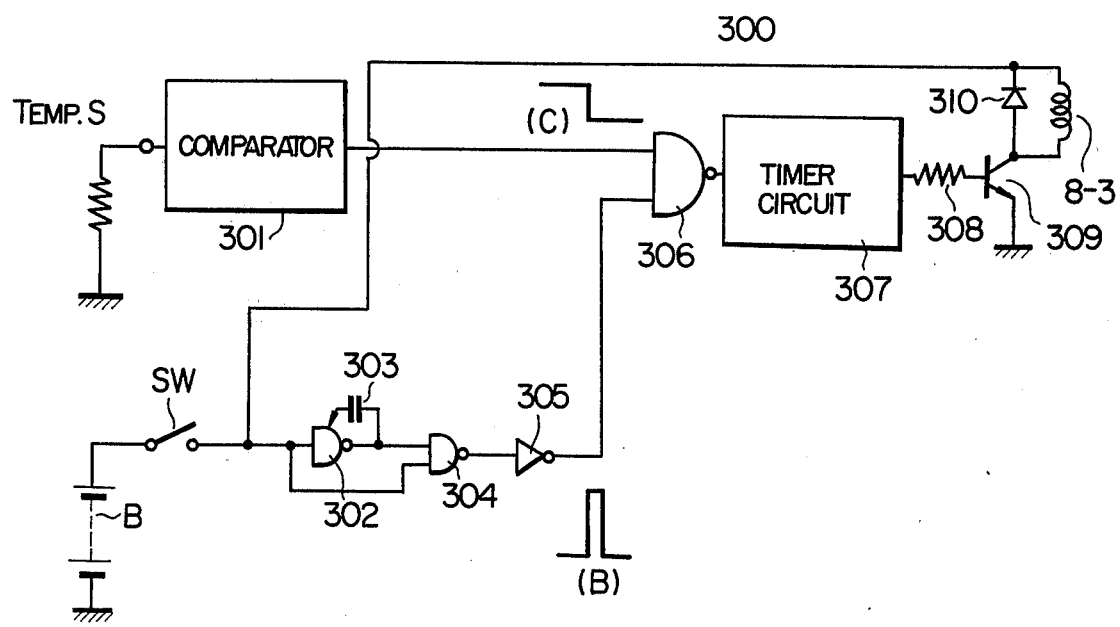

The above cold engine starting detecting circuit 7G may be replaced with an exhaust gas temperature detector or water temprature detector to obtain similar effects. FIGS. 19 and 20 show other examples of the control circuit. In the example of FIG. 19, an exahaust gas temperature detector (or water temperature detector) Temp. S is used, and its output is coupled to a comparator circuit comprising resitors 201, 202 and 203 and a comparator 204 for comparison to determine whether the engine is warmed up or not. When the engine is warmed up, a transistor 206 is triggered through a resistor 205, thus energizing the electromagnetic clutch 8-3. The example of FIG. 20 is a timer system. Upon closure of a key switch SW a mono-stable multi-vibrator comprising a NAND circuit 203 with an expander, a NAND circuit 304, a capacitor 303 and a NOT circuit 305 produces a positive differential pulse as shown at B in FIG. 20. When the output of a comparator 301 comparing the output of a temperature detector Temp S represents the cold engine starting situation, i.e., of level 1, NAND circuit 306 produces a negative differential pulse to render a timer circuit 307 operative. A transistor 309 is cut off at this moment through the resistor 308, and after the lapse of a preset time it is triggered again to energize the electromagnetic clutch 8-3, whereby the pulse motor 8-1 and control valve are coupled together.

While the preceding embodiment has concerned with systems where compensating air is used for compensating the air-to-fuel ratio, similar arrangements are of couple possible in air-to-fuel ratio compensating systems where the aperture area of a main jet in the carbureter or the like is varied. Also, in place of the pulse motor 8-1 other types of motors such as servo motor may be used as the drive motor of the drive unit 8 as well.

Figure 22:
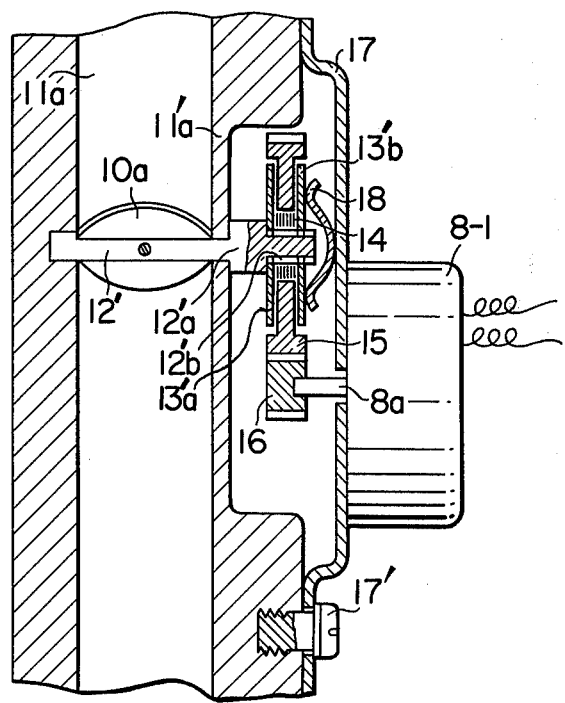
FIG. 22 is a sectional view showing that part of a third embodiment of the invention which corresponds to the compensating air passage portion shown in FIG. 1.

A third embodiment of the invention will now be described. FIG. 22 shows part of this embodiment correspnding to the compensating air passage 11a, control valve 10a and pulse motor 8-1 in the embodiment of FIG. 1. In this embodiment, a butterfly valve is used as the control valve 10a. Numeral 12' designates a control valve shaft carrying the control valve 10a secured thereto. Its one end portion penetrates the wall 11'a of the compensating air passage 11a. This portion includes an increased diameter portion 12'a and a tip gear portion 12'b of a diameter smaller than that of the increased diameter portion 12'a. The gear portion 12'b meshes with teeth cut on the inner peripheries of disc-like members 13'a and 13'b, between which a resin strip ring 14 of such material as "Derlin" (a trade name) is interposed. A third gear 15 having gear teeth cut on the outer periphery thereof is fitted on the slip ring 14 and also interposed between the disc-like members 13'a and 13'b. The third gear 15 is slightly greater in its thickness than that of a space defined by the disc-like members 13'a and 13'b at a portion where the third gear 15 is interposed between the disc-like members 13'a and 13'b. The third gear 15 meshes with a fourth gear 16 which is secured to the drive shaft 8a of the drive motor 8-1. Numeral 17 designates a cover secured by means of bolts 17' to the wall of the compensating air passage. The drive motor 8-1 is installed on the cover 17. Numeral 18 designates a plate spring interposed between the disc-like member 13'b and cover 17 and urging the disc-like member 13'b, third gear 15 and disc-like member 13'a against the shoulder of the large diameter portion 12'a. Consequently, the disc-like members 13'a and 13'b are held in forced contact with the third gear 15. The plate spring 18 may of course be replaced with a compression spring.

With the above construction, since the third gear 15 is normally held in forced contact with the disc-like members 13'a and 13'b, the drive force of the drive motor 8-1 is transmitted due to the frictional coupling of these parts, more particularly through the fourth gear 16, the third gear 15, the disc-like members 13'a and 13'b and the gear portion 12'b, to the control valve shaft 12'. If the signal from the discriminating circuit of FIG. 15 continues to prevail after the reaching of the fully closed position of the control valve 10a, with the drive motor 8-1 tending to rotate for further rotating the control valve 10a from the fully closed state, the driving force of the drive motor 8-1 surpasses the frictional force between the third gear 15 and disc-like members 13'a and 13'b, so that the third gear slips and runs idly. As a consequence, damage to the control valve 10a or trouble with the drive motor 8-1 due to increase of load of the drive motor 8-1 can be reliably prevented.

When the control valve 10a becomes incapable of rotation due to an accident or any other reason, the third gear will also slip in the manner as described above. Further similar effects may be obtained where other valves than the butterfly valve are used as the control valve 10a.

It will be apparent that in the above construction the second gears 13'a and 13'b and third gear 15 constitute a slip mechanism.

We claim:

1. An air-to-fuel ratio controlling system for an internal combustion engine comprising;
    a carbureter connected to an intake manifold of an internal combustion engine and including a main passage and a bypass passage for supplying air-fuel mixture to said engine;
    said main passage being provided with a main valve for controlling an amount of the air-fuel mixture, and said bypass passage being also provided with a bypass valve for compensating the air-to-fuel ratio of said air-fuel mixture by controlling an amount of air-flow flowing therethrough;
    an air-to-fuel ratio sensing means mounted in an exhaust manifold of said engine for detecting the air-to-fuel ratio of the air-fuel mixture supplied to said engine;
    an electric control circuit connected to said air-to-fuel ratio sensing means for producing an output signal in accordance with the output of said air-to-fuel sensing means;
    a driving means coupled to and driving said bypass valve in response to said output signal from said electric control circuit, whereby the amount of the air-flow flowing through said bypass passage is decreased when the air-to-fuel ratio of the air-fuel mixture detected at said air-to-fuel ratio sensing means is higher than a predetermined value, and the amount of the air-flow flowing through said bypass passage is increased when the air-to-fuel ratio of the air-fuel mixture detected at said air-to-fuel ratio sensing means is lower than said predetermined value, thus to compensate the air-to-fuel ratio of the air-fuel mixture to be supplied to said engine;
    an engine condition detecting means for detecting the condition of said engine and for producing an actuating signal when said engine condition of said engine is sufficient for said air-to-fuel ratio sensing means to effectively operate; and
    an electric clutch means connected between said bypass valve and said driving means;
    said electric clutch means including a magnetic coil connected to said engine condition detecting means which is energized by said actuating signal, to thereby permit the driving force of said driving means to transmit to said bypass valve.

2. An air-to-fuel ratio controlling system for an internal combustion engine as set forth in claim 1 wherein said engine condition detecting means comprises;
    an engine starting condition detecting means for producing a setting signal when said internal combustion engine is started;
    discriminating means connected to said air-to-fuel ratio sensing means and for producing a resetting signal when the output of said air-to-fuel ratio sensing means exceeds a predetermined value; and
    an actuating means connected to said engine starting condition detecting means and said discriminating means and for producing a nonactuating signal and said actuating signal;
    said nonactuating signal being produced when said setting signal is applied to said actuating means, whereby said magnetic coil remains in a deenergized condition, and said actuating signal being produced when said resetting signal is applied to said actuating means, whereby said magnetic coil is energized.

* * * * *